United States Patent
Tengblad et al.

[11] Patent Number: 5,867,982
[45] Date of Patent: Feb. 9, 1999

[54] SYSTEM FOR REDUCING EMISSIONS IN CATALYTIC CONVERTER EXHAUST SYSTEMS

[76] Inventors: Roger Tengblad, Richertsgatan 2C, S-412 81 Göteborg; Edward Jobson, S-442 77 Romelanda, Zäsarväven 5; Staffan Lundgren, S-430 63 Hindas, Bandyvägen 8; Maria Hansson, Gibraltargatan 19A, S-412 58 Göteborg; Göran Wirmark, Kung Svenos 48, S-417 28 Göborg, all of Sweden

[21] Appl. No.: 458,753

[22] Filed: Jun. 2, 1995

[51] Int. Cl.$^6$ ........................... F01N 3/00
[52] U.S. Cl. ................ 60/274; 60/284; 60/285; 60/307; 60/289; 123/198 F
[58] Field of Search ................ 60/274, 284, 285, 60/307, 289; 123/198 F

[56] References Cited

U.S. PATENT DOCUMENTS

| | | | |
|---|---|---|---|
| 3,800,772 | 4/1974 | Gospodar | 123/198 F |
| 4,007,590 | 2/1977 | Nagai | 123/198 F |
| 4,107,921 | 8/1978 | Iizuka | 123/198 F |
| 5,211,011 | 5/1993 | Nishikawa | 60/284 |
| 5,465,574 | 11/1995 | Ma | 60/284 |
| 5,490,381 | 2/1996 | Becker | 60/284 |
| 5,501,073 | 3/1996 | Miyashita | 60/284 |
| 5,517,820 | 5/1996 | Kuroda | 60/284 |
| 5,519,993 | 5/1996 | Rao | 60/284 |
| 5,577,383 | 11/1996 | Kuroda | 60/284 |
| 5,584,177 | 12/1996 | Oketani | 60/284 |

FOREIGN PATENT DOCUMENTS

| | | |
|---|---|---|
| 0 422 432 A1 | 4/1991 | European Pat. Off. . |
| WO 92/22734 | 12/1992 | WIPO . |
| WO 93/07365 | 4/1993 | WIPO . |

*Primary Examiner*—Thomas E. Denion
*Attorney, Agent, or Firm*—Birch, Stewart, Kolasch & Birch, LLP

[57] ABSTRACT

The invention relates to a system for reducing emissions in catalytic converter exhaust systems for an internal combustion engine. The invention comprises air-fuel mixture forming means for providing a mixture of air-fuel to the engine, a catalytic converter for purifying an exhaust gas mixture from the engine, and a control unit adapted for controlling the mixture forming means so that an excess of hydrogen is generated in the exhaust gas mixture during the start-up of the engine. According to the invention, the excess of hydrogen is maintained essentially unburnt within the catalytic converter so as to provide a short light-off time for the catalytic converter.

19 Claims, 2 Drawing Sheets

SYSTEM FOR REDUCING EMISSIONS IN CATALYTIC CONVERTER EXHAUST SYSTEMS

FIELD OF THE INVENTION

The present invention relates to a system for reducing emissions from exhaust systems fitted with catalytic converters. The invention also relates to a method of reducing emissions from exhaust systems fitted with catalytic converters by controlling the air/fuel ratio (lambda ($\lambda$) coefficient) in a particular manner.

BACKGROUND OF THE INVENTION

The reduction of emissions from vehicle exhaust systems is a well known problem. As the number of vehicles having an internal combustion engine continues to increase, the problem is becoming more severe and despite the introduction of catalytic converter exhaust systems, the exhaust emissions from vehicles fitted with such systems are still relatively high.

In particular exhaust emissions are relatively high during the initial warm-up phase of an internal combustion engine after starting, especially with regard to the emissions of carbon monoxide, oxides of nitrogen and hydrocarbons. This is largely due to the fact that the catalytic converter has not reached its so-called "light-off" temperature, at which the catalyst constituted by the noble metals (typically platinum, rhodium and palladium present in the washcoat matrix of the catalytic converter brick) causes the required catalytic reactions to take place. The light-off temperature can be defined as the temperature at which the catalytic converter reaches 50% conversion. Modern catalyst systems-start operating at temperatures of around 200° C. to 300° C.

In order to reduce the quantity of harmful emissions during said initial warm-up phase, a plurality of different solutions has been proposed, many of these solutions being based on shortening the time taken to reach the light-off temperature by raising the temperature in the catalyst as fast as possible.

An example of one of these systems is one making use of an exhaust afterburner (see e.g. EP-A-0 422 432), comprising a combustion chamber in which exhaust products present in the exhaust gases are ignited so as to raise the temperature of the gases passing through the catalytic converter and thereby, in turn, raise the temperature of the catalytic converter itself, so that light-off is quickly reached.

The required ignition of the gases can be performed with the aid of an ignition device which is placed either upstream of the catalytic converter or between two stages (i.e. between two "bricks") of the catalytic converter.

Such devices have however suffered from the problem that the quantity of unburned hydrogen and oxygen is often insufficient to produce a rapid and reliable heating of the catalytic converter.

In order to overcome these drawbacks, WO-A-92/22734 and WO-A-93/07365 each discloses a system whereby the hydrogen and oxygen mixture which reaches the ignition zone in the afterburner combustion chamber is readily ignitible by the ignition device immediately after cranking of the engine. This is achieved by ensuring that the concentration of hydrogen and oxygen remains within known flammability limits. In order to obtain the required concentrations, the fuel/air mixture is enriched significantly so as to obtain additional hydrogen, whilst additional oxygen is added by means of a supplementary air pump.

Although an improvement is obtained hereby, a severe drawback of the system is that an ignition device is required in the afterburner. Such an ignition device constitutes an extra component which is prone to failure. Moreover, from the consumer point of view, this is undesirable due to the resultant extra cost involved with the more expensive exhaust system and the ensuing costs of servicing and/or replacing worn-out or faulty afterburner ignition devices.

A further disadvantage presents itself in that exhaust oxidation or heat energy generated by the combustion in the engine is to a great extent lost during transport thereof to the catalytic converter.

Another disadvantage of prior art systems which supply extra air to the exhaust system is that additional air supply equipment is required. This extra equipment is costly to provide and may thus affect the final vehicle price significantly. Moreover, the use of such additional equipment, especially when added to existing engines and existing vehicles, requires space for fitting of the supply equipment around the engine and bodywork parts. Such fitting can be very difficult to accommodate and significant re-design of existing vehicles, their engines or their exhaust systems may be required. This will also add to cost of course. Thus, in a preferred embodiment of our invention, means are provided for obviating the need for such hardware.

An additional disadvantage is that such auxiliary equipment will increase the weight of the vehicle.

SUMMARY OF THE PRESENT INVENTION

The object of the present invention is to overcome the above-mentioned disadvantages, whilst still achieving short light-off times.

The aforementioned object is achieved by a system for reducing emissions in catalytic converter exhaust systems for an internal combustion engine, comprising air-fuel mixture forming means for providing a mixture of air-fuel to the engine, a catalytic converter for purifying an exhaust gas mixture from the engine, an air supply system for providing a surplus of oxygen to the exhaust gas mixture to the engine, and a control unit adapted for controlling the mixture forming means so that a high concentration of hydrogen is generated in the exhaust gas mixture during the start-up of the engine, wherein the major part of the hydrogen is heterogeneously converted in said catalytic converter.

According to a particular embodiment of the invention, the air supply system is in the form of a separate air pump. The surplus air may also be provided by controlling the combustion chambers of the engine to expel a surplus of air.

Additionally said object is achieved by a method for reducing emissions from exhaust systems fitted with catalytic converters by controlling an internal combustion engine, comprising the steps of controlling the input of fuel and air to the engine for obtaining a predetermined air-fuel ratio, said air-fuel ratio being sufficiently low so as to provide an excess of hydrogen in the exhaust gas from the engine, supplying surplus oxygen to the exhaust gas mixture during start-up of the engine, feeding the exhaust gas to a catalytic converter during the start-up of the engine, and maintaining the excess of hydrogen within the catalytic converter so that a major part of the hydrogen is heterogeneously converted in said catalytic converter, thereby providing a decrease of the light-off temperature of the catalytic converter.

Preferably, a surplus of air is supplied to the exhaust gas during start-up of the engine.

The object of the present invention is also achieved by means of a method for reducing emissions from exhaust systems fitted with catalytic converters by controlling an internal combustion engine, comprising the following steps: preheating the catalytic converter during a predetermined first time period, controlling the input of fuel and air to the engine for obtaining a predetermined air-fuel ratio during a second time period, said air-fuel ratio being sufficiently low so as to provide an excess of hydrogen in the exhaust gas from the engine, supplying surplus oxygen to the exhaust gas mixture at least during the second time period, and maintaining the excess of hydrogen within the catalytic converter so that a major part of the hydrogen is heterogeneously converted in said catalytic converter, thereby providing a decrease of the light-off temperature of the catalytic converter.

The invention relies on the principal of providing a sufficient amount of hydrogen and oxygen in the exhaust gas mixture in such amounts that these two gases will still be maintained essentially unburnt in sufficient quantities before the catalytic converter during the start-up phase of the engine. However, the invention is vastly superior to the prior art known from the aforementioned WO-A-92/22734 and WO-A-93/07365 since the system of the present invention has no afterburner at all but instead relies on exploiting the lower light-off temperature for catalytic hydrogen combustion by ensuring the presence of essentially unburnt hydrogen itself in the catalytic converter during a certain time span.

As is known per so, a catalytic converter may have a conversion efficiency of about 99% during normal driving conditions when the engine management system provides a fuel/air mixture corresponding to the normalised ratio $\lambda=1$. The enriching of the fuel/air ratio to a level which is below $\lambda=1$ will cause excess hydrogen to be generated in the exhaust system, since the rich combustion will give rise to the well known water gas shift equilibrium reactions,

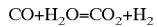

$$CO+H_2O=CO_2+H_2$$

By reducing $\lambda$ down to a value of between 0.7 and 0.8 for example, the corresponding amount of hydrogen present in the exhaust gases will then be present in an amount of between about 5.2% (for $\lambda=0.7$) and 2.6% (for $\lambda=0.8$), said percentages being quoted in percentage by volume in the gas phase (this also applies to all other percentages quoted hereinafter).

Reduction of the $\lambda$ parameter down to about 0.65 is also imaginable within the scope of the present invention and will result in even higher hydrogen concentrations of 10% or more, although the exact lower limit of $\lambda$ has to be controlled with respect to other factors such that no risk of explosion can occur.

Such low values of the $\lambda$ parameter can be achieved by altering the engine's control system in such a way that the control output to the fuel injector is arranged to ensure a rich mixture of the fuel/air ratio during the start-up phase. Such may occur by increasing the fuel injection time and/or by delaying the fuel injection timing. Further methods are also available for increasing the amount of hydrogen gas in the exhaust, such as altering the timing of the ignition spark, decreasing the amount of input air to the engine, adjusting the timing of the fuel injection and adjusting the valve lifting and timing.

Whilst it might be expected that the hydrogen present should now be ignited homogeneously so as to raise the temperature of the catalytic converter (as with the afterburner prior art devices) the invention however goes against this hitherto adopted principle and instead maintains the hydrogen-rich exhaust gas mixture at the catalytic converter. Suprisingly the light-off time of the catalyst is reduced substantially.

For $\lambda=0.8$, for example, a catalyst light-off temperature for hydrogen conversion of between about 90° C. and 100° C. can be obtained on test apparatus, when using secondary air and a known catalytic converter with a ratio of 1:14:1 parts of platinum:palladium:rhodium. In actual vehicle applications it is however possible that the light-off temperature may be slightly higher (e.g. up to 120° C.), although the light-off temperature-lowering effect of the hydrogen presence will still be maintained of course.

In theory, it appears that the hydrogen gas is quickly transported to the surface of the catalytic converter where it easily dissociates into free hydrogen atoms which then react at the free active sites (i.e. the noble metal sites) with the dissociated oxygen which is present. In this way the catalyzer has a much lower light-off temperature for hydrogen than for hydrocarbons.

Due to the lower light-off temperature of the catalytic converter for performing the oxidation of hydrogen which results in an exothermic reaction (providing rapid heating of the catalyzer brick(s)) the catalytic converter begins to function earlier and the temperature of the unit and the other gases passing through the catalytic converter is raised rapidly such that the other required gas transformations (hydrocarbons and CO) can take place. Typically the hydrocarbon and carbon monoxide conversion will occur at temperatures above 200° C.

In order to maintain the lower light-off temperature conditions by using the hydrogen as described, the hydrogen should be maintained around the catalyst for a time period of a minimum of a few seconds. In particular cases it may also be appropriate to supply extra hydrogen for longer periods, for example up to 30 seconds. Indeed, where the amount of hydrogen used is relatively low (such as in the case of $\lambda=0.8$ to 0.9) and the amount of oxygen is low (e.g. at equivalent $\lambda=1.0$), the time of hydrogen supply may be very long indeed (2 or more minutes). Thus, it has been found that shorter light-off times and lower light-off temperatures are obtained when the values of $\lambda=0.7$ and $\lambda_{equivalent}=1.2$ are used, where $\lambda_{equivalent}$ can be defined as the lambda value after addition of secondary air.

However, the use of $\lambda_{equivalent}<1$ may however be that required in practice since otherwise a greater dilution and cooling of the other exhaust gases would occur. Basically the following rule applies: the longer the period of hydrogen and oxygen surplus is and the higher the concentrations of both are the greater the effect of the exothermic reaction for warming up the catalyzer to a higher temperature.

The catalytic converter can be heated by means of exhaust oxidation of by utilizing heat energy from the combustion, which in turn may be increased by delaying the timing or by means of earlier valve opening timing.

By using the lower light-off temperature for hydrogen oxidation, specific advantages can be obtained regarding the adsorption of hydrocarbons, as will now be explained.

Hydrocarbon adsorbers, or "traps" as they are known, are specific adsorbent materials which are placed in the exhaust system normally upstream of the catalytic converter or integrated with the catalyst on the same substrate. The adsorbent material can be integrated in such a way that it is mixed in the same washcoat or alternatively arranged in separate layers. The adsorbent properties of the materials are such that they adsorb hydrocarbons at low temperatures and desorb them at higher temperatures. Known exhaust gas adsorbers typically consist of, for example, zeolite materials. The idea of using such a material is that the hydrocarbons will be adsorbed during the warm-up phase of the engine when the catalytic converter is below its hydrocarbon light-off temperature and then released once the light-off temperature has been reached.

A major problem with such prior art adsorbent systems is however that the desorption temperature of the adsorbent material is normally significantly below the light-off temperature. Tests have shown for example that the desorption temperature for very good adsorbers is as low as 100°–150° C., although literature on the subject indicates that desorption temperatures for some new materials of up to 180° C. might be possible. However, since the initial light-off temperature is in the region of 250° C. for prior art catalysts, the hydrocarbons will be desorbed at least several seconds prior to catalyst light-off and will thus exit from the exhaust system without having undergone catalytic oxidation.

However, with the rapid heating of the catalytic converter, only a small time period elapses from when the desorption temperature of the adsorbent is reached until the light-off temperature for the hydrocarbon oxidation is reached. This short time does not allow desorption of a substantial part of the hydrocarbons on the adsorbents. In this way it is thus possible to obtain very low throughput of harmful exhaust gases.

One disadvantage of many prior art systems which supply extra air to the exhaust system is that additional equipment (e.g. a secondary air pump, additional piping and an outlet connection to this exhaust) is required. Such a system is shown in WO-A-93/07365 for example. Whilst such known systems can of course be used with the present invention, such systems are costly and thus a further improvement to such systems is also proposed hereinafter.

The secondary air is supplied in accordance with the invention in such an amount that it preferably lies in the range of an equivalent $\lambda$ ratio (i.e. $\lambda_{equivalent}$, which corresponds to the ratio after addition of secondary air) of between 1 and 1.2. It can of course lie at a higher equivalent lambda level such as $\lambda_{equivalent}=1.3$, if required in the particular engine of application.

Using a value of $\lambda=0.7$ for gases entering the combustion chambers in the engine to produce a high hydrogen concentration, and an equivalent lambda ratio when air has been added, i.e. $\lambda_{equivalent}=1.0$, under test conditions, produces about 8.1% $O_2$ by volume of the exhaust gases in the gaseous phase, whilst use of equivalent air ratio of $\lambda_{equivalent}=1.2$ produces about 11.4% $O_2$. The same tests carried out at $\lambda=0.8$ for producing a high concentration of hydrogen give $O_2$ pencentages of 4.7% and 8.0% for equivalent $\lambda=1.0$ and 1.2.

Secondary air for use in the present invention will normally be supplied from shortly after engine firing. In order to achieve this, whilst at the same time providing a high concentration of hydrogen, the present invention provides production of secondary air by means of a pump device or by operating the engine in a particular manner.

One manner of operating the vehicle engine to produce additional air in the exhaust system is by cutting off the fuel supply to one or more of the cylinders. If the method of achieving a higher amount of hydrogen in the exhaust gas is to richen the fuel/air ratio (i.e. $\lambda<1$) or to alter the timing, then said cutting-off of the supply to said one or more cylinders must be carried out such that the combustion process of the whole engine produces more hydrogen, but at the same time the quantity of air in the exhaust increases. Such can be achieved by selectively cutting off the fuel supply to one or more cylinders.

One way of doing this according to the invention is to supply a fuel-rich mixture to all engine cylinders apart from one, such that the fuel supply is blocked to said one cylinder. In this way said one cylinder will basically act to pump air into the exhaust system, in a series of separate pulses in a four-stroke engine, whilst the firing cylinders (i.e. those being fed with fuel and air) will produce excess hydrogen in the exhaust gases.

A further way of achieving the required effect is to selectively block the fuel supply to two or more of the cylinders (e.g. by a sequential blocking of said fuel supply to each of said cylinders to be blocked), whilst supplying the required surplus fuel to the other cylinders.

A still further manner of achieving the required additional air according to the invention would be to run one or more of the cylinders on a very fuel-lean mixture. This method will often be preferred since it can still be ensured that firing will occur due to the fuel in the cylinder even though the combustion will not be complete.

Even where uneven-numbered cylinder engines are concerned (e.g. 3, 5 or 7 cylinder engines etc.) the first two methods above may in fact still be acceptable since the resultant uneven running of such engines (due to the standard timing sequence) need only continue for a short period of time in order to supply sufficient additional oxygen to the system, thereby obtaining sufficient heat in the catalyst. Such period of time may for example be only a few seconds after initial starting. However, lean running as per the third of the aforementioned methods would of course provide an improved warm-up impression for the user since the engine would appear to be running more smoothly as soon as ignition takes place, although the amount of oxygen required would take longer to supply.

A further method which could be adopted in e.g. 5-cylinder engines, although not preferred due to its complication, would be to block the fuel to one of said cylinders and, by appropriate manipulation of the electronic circuitry, run the engine as a four cylinder engine with an altered timing sequence and then switch to a five cylinder sequence when the required amount of oxygen has been added to the exhaust system.

Preferred features and other aspects of the invention will be apparent to the reader from the following description. However, various changes and modifications within the scope of the invention will become apparent to those skilled in the art by the following detailed description.

BRIEF DESCRIPTION OF THE DRAWINGS

The invention will now be described with reference to particular embodiments depicted in the drawings, in which.

DETAILED DESCRIPTION OF THE PREFERRED EMBODIMENT(S)

Figure 1:
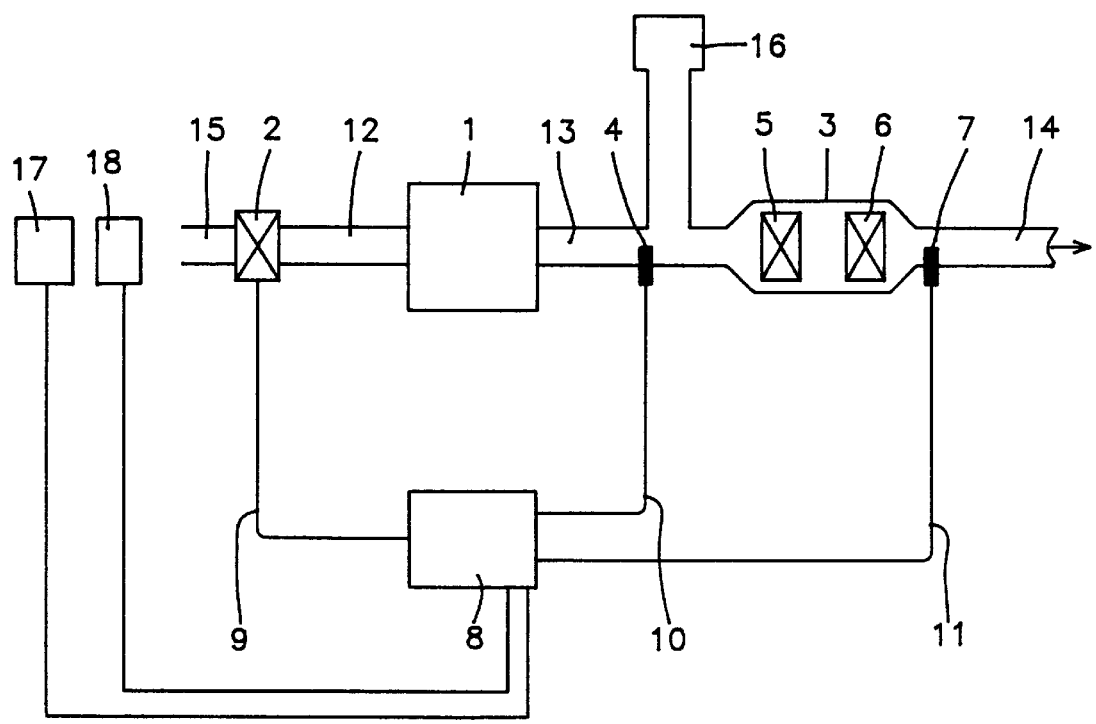
FIG. 1 depicts a simple block diagram of a typical fuel injection control system fitted to an engine with a catalytic converter.

FIG. 1 shows schematically form a system in which the exhaust system of the present invention is incorporated. The system depicts the basic elements required to understand the device with reference to an internal combustion engine 1 of conventional type. In a known manner, the engine 1 is supplied with an air-fuel mixture via an intake manifold 15. In order to obtain a suitable air-fuel mixture, the engine is provided with air-fuel mixture forming means 2, the operation of which is controlled by a electronic control unit 8 via a connection 9. The mixture forming means 2 comprises at least one fuel injector (not shown) and an air inlet valve (not shown).

The air-fuel mixture is fed to the engine 1 via an intake pipe 12 (which is part of the inlet manifold). The exhaust gas from the engine 1 is conducted to a catalytic converter (such as a three-way-catalyst) 3 by means of an exhaust pipe 13. The catalytic converter may be of a previously known type such as one having a washcoat of 1:14:1 parts of platinum, palladium and rhodium, respectively, and generally comprises one to three matrices, or bricks 5, 6. An exhaust gas sensor 4 is arranged in the exhaust pipe 13, upstream of the catalytic converter 3. The exhaust gas sensor 4 is preferably a so-called lambda sensor, which provides a continuous output signal indicating the concentration of oxygen in the exhaust gas. This signal is fed to the control unit 8 via a connection 10. The control unit 8 is adapted for calculating the correct air-fuel mixture composition in the intake pipe 12 for the prevailing conditions. The gases coming out of the catalytic converter 3 are fed to the atmosphere through an exhaust outlet pipe 14.

The system can comprise an additional exhaust gas sensor 7, which preferably is of the lambda sensor type, and which is also connected to the control unit 8, via a further connection 11. The additional sensor 7 is normally used for fine-tuning of the air-fuel ratio and for catalyst diagnostics (i.e. in the invention it may be used for light-off diagnostics) but can also be utilized for detecting a deteriorated catalytic converter 3 for example.

The system may also comprise an air mass flow meter 17 and a throttle angle potentiometer 18, which are connected to the control unit 8 via two connections.

According to a first embodiment of the invention, especially during the start-up phase of the engine 1 (i.e. during the warming up of the engine immediately after starting thereof), the control unit 8 controls the air-fuel mixture forming means 2 in a manner so as to ensure a rich mixture of a $\lambda$ ratio which is lower than the stoichiometric ratio $\lambda=1$ for one or more cylinders. Such a control may occur by increasing the amount of fuel injected to the engine or by increasing the fuel injection time. A further way to achieve this control is by decreasing the amount of air which is delivered to the engine. This operation ensures a rich air-fuel mixture during the start-up phase of the engine 1. Further methods are also available for increasing the amount of hydrogen gas in the exhaust, such as altering the spark ignition timing. During the first few seconds the fuel injection is normally adjusted in relation to the air mass flow meter 17 and throttle angle potentiometer 18 in order to generate the desired air-fuel ratio.

The control unit 8 can be operated so as to provide an air-fuel mixture of for example $\lambda=0.7$, which leads to an excess of hydrogen of 5.2% being generated in the exhaust gas. This hydrogen excess is generated during a limited time period after starting of the engine, for example 10 to 30 seconds.

In order to obtain a quick ignition of the catalytic converter 3, additional air should be added to the exhaust gas. Consequently, this additional air should be mixed with the hydrogen present in the exhaust gas. According to a first embodiment of the invention, this additional air is be supplied by means of an air supply system in the form of an air pump 16, the output of which is fed into the exhaust gas upstream of the catalytic converter 3. The air pump 16 is preferably operated so as to provide additional air during the time period during which an excess of hydrogen in the exhaust gas is generated.

The hydrogen is maintained essentially unburnt when entering the catalytic converter. This means that the combustion of the hydrogen is carried out by a heterogeneous conversion of the hydrogen on the catalytic surface, as opposed to a homogeneous conversion process.

Figure 2:
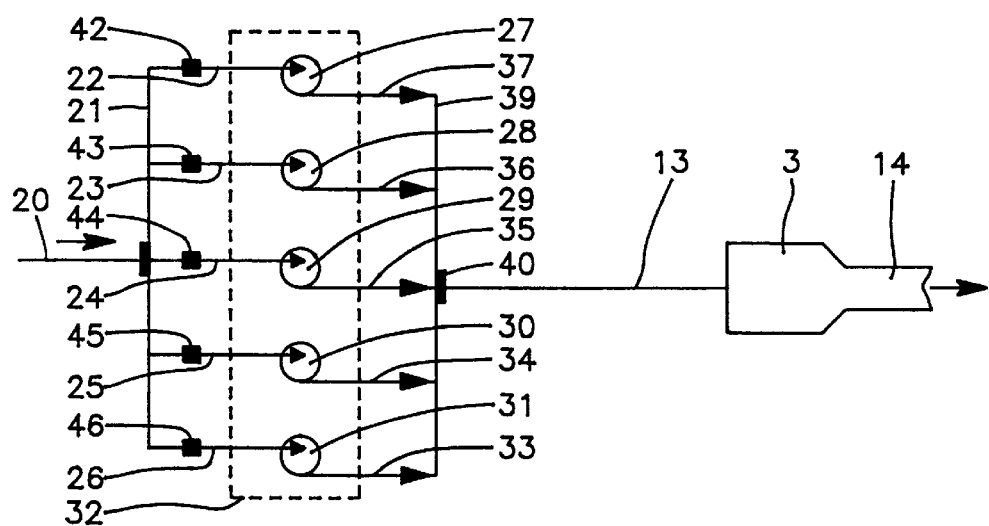
FIG. 2 depicts a schematic view of a five-cylinder engine with an air and fuel supply system as well as an exhaust system.

A further embodiment of the invention is depicted in FIG. 2, in which reference 20 denotes a common air inlet with branches, by means of branch pipe 21, into five separate inlet pipes 22–26 on the inlet side of respective combustion chambers 27–31. An engine block containing said combustion chambers is shown in dashed lines and is denoted 32. Each of the pipes 22–26 has its own fuel injector 42–46 which is arranged to vaporise (atomise) fuel into small droplets for mixing with the air moving through pipes 22–26. Each combustion chamber has an outlet or exhaust side, at which is arranged an outlet pipe 33–37. Said outlet pipes then feed into an exhaust pipe 13 by means of a branch pipe and a suitable connection 40. The arrows in the figure indicate gas flow. Each of the fuel injectors 42–46 is connected to the lambda control unit 8 by a connection (not shown) such as connection 9 in FIG. 1.

It should be noted that the air supply system may be in the form of a process which may be computer-controlled (thus not using the "hardware" surplus air supply system 16) and which may control the operation of the engine in order to supply a surplus of oxygen. In accordance with a particular embodiment of the invention the vehicle engine 1 is adapted to produce additional air in the exhaust system by cutting off the fuel supplied to at least one of the cylinders, e.g. combustion chamber 27. The fuel to more than one cylinder, e.g. to two combustion chambers 27 and 28, may also be cut off if required. Such a fuel cut-off device may take many forms, such as the selective blocking of the injector, e.g. injector 42, associated with any single combustion chamber (where multiple injectors are used as shown in FIG. 2). Such selective blocking can be programmed into a lambda control unit 8 which controls the fuel injection. Alternatively, selective blocking of the fuel supply to the single injector in air-fuel mixture forming means 2 (if single point injection is used) such as by a mechanically operated shutter means may be the method chosen.

As explained above, if the amount of hydrogen in the exhaust gas is to be increased by manipulation of the engine's fuel control system simultaneously with an increase in oxygen content in the exhaust, then the combustion process of the whole engine (i.e. for all of the engine's cylinders combined) must also produce more hydrogen. Such can be achieved by selectively cutting off the fuel supply to one or more of the injectors associated with the engine's cylinders and at the same time, or substantially the same time, supplying a fuel-rich mixture to all or some of the other engine cylinders. For example, in FIG. 2, the fuel injector 42 feeding into e.g. the fifth combustion chamber 27 might be blocked by appropriate means, whilst the other four cylinder combustion chambers 28–31 are run on a rich air-fuel mixture. All such functions can be accomplished by appropriate programming of the control unit 8. Alternatively, a mechanical blocking mechanism might be used which could be opened after the catalyst light-off temperature has been reached, or alternatively after a specific time period. This procedure will possibly be repeated to maintain low tailpipe emissions.

In this way said one combustion chamber 27 will basically act as a pump delivering a series of oxygen pulses to the exhaust system, due to the movement of the piston therein, by drawing air in through the inlet manifold 22 and pumping air, and thus oxygen, out into the pipe 32. This of course occurs whilst one or more of the firing cylinders 28, 29, 30 and 31 (i.e. those being fed with fuel and air) are allowed to produce a high concentration of hydrogen in the exhaust gases by supplying them with a fuel-rich fuel/air mixture of less than $\lambda=1$, e.g. $\lambda=0.7$.

According to a particular embodiment of the invention, an improved operation is achieved if the catalytic converter 3 is optimized, i.e. if its structure is adapted for operation with an excess of hydrogen. In particular, the amount of palladium in the catalytic converter 3 may be increased while the amounts of rhodium and platinum is maintained. The use of an engine shut-down procedure in which the catalyst is reduced by an excess of reducing components in the exhaust will further decrease the light-off temperature during subsequent engine starts.

A further way of achieving the required effect is to selectively block the fuel supply to more than one cylinder (e.g. by a sequential blocking of said fuel supply to each of the cylinders to be blocked, in turn), whilst supplying the required fuel to the remaining cylinders. Taking again the example of a five-cylinder engine in FIG. 2, the fuel supply to the first 32 and the fifth 27 chambers might be blocked either during one round of engine cycles or alternated between sequential rounds of engine cycles (one "round" being the number of revolutions of the engine required to produce ignition on each of the five cylinders during normal operation).

A still further manner of achieving the additional air according to the invention would be to run one or more of the cylinders on a fuel-lean mixture, whilst running one or more of the remaining cylinders on a fuel-rich mixture. If this method is used, the number of cylinders running on a lean mixture is preferably a minor number of the engine's cylinders (i.e. one or two in a five-cylinder engine).

The latter method will often be preferred since it can still be ensured that firing will occur due to the fuel in the cylinder(s) fed with a lean mixture even though the combustion will not be complete. In this way the vehicle driver will have less, or no sensation that the vehicle engine is not running normally.

A further improvement in the system of the invention can be provided by fitting a hydrocarbon adsorber to the exhaust system at a location upstream of said catalytic converter or within said catalytic converter.

Figure 3:
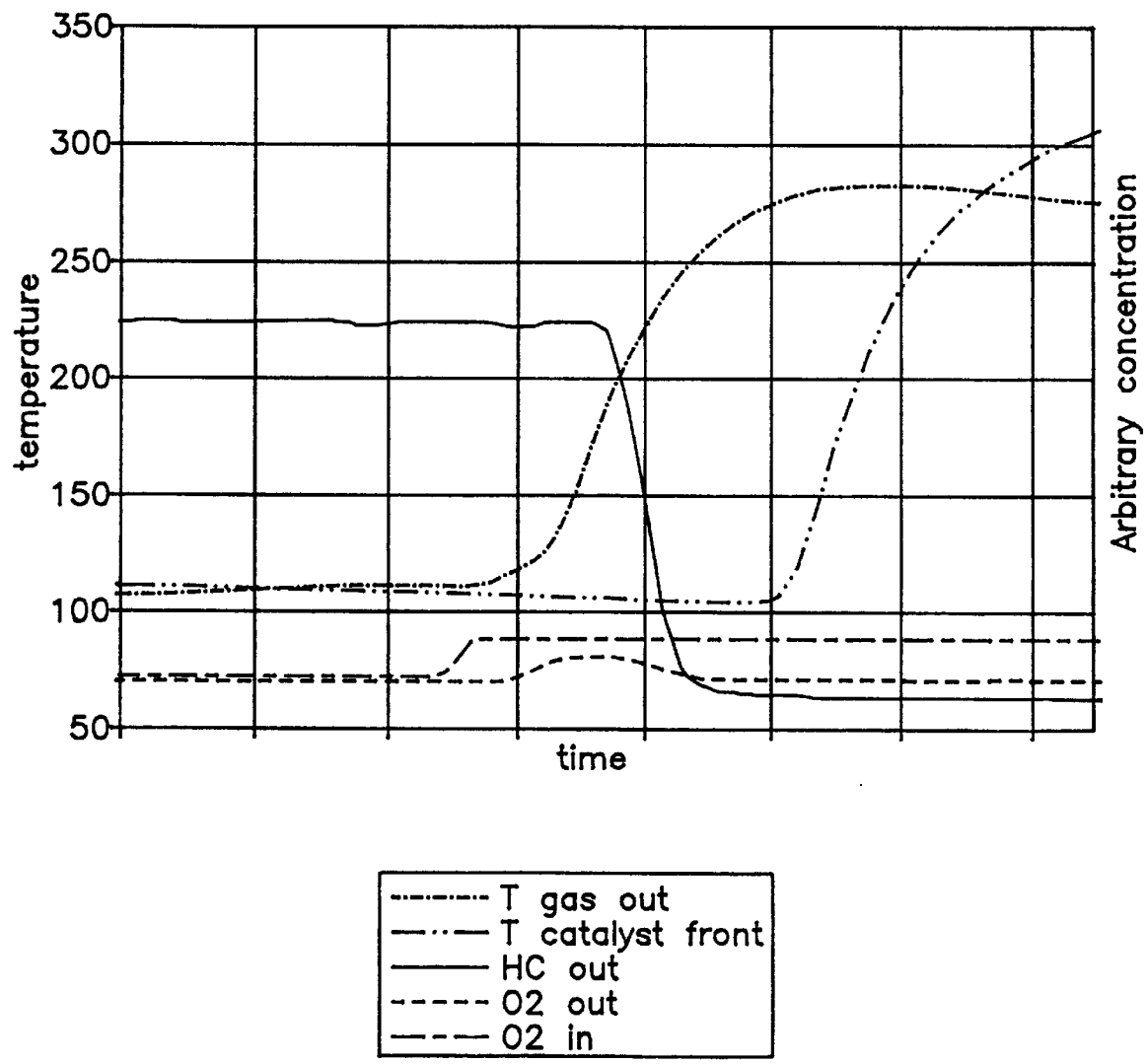
FIG. 3 depicts gas concentrations in the exhaust gas during operation of the invention.

The working principles of the invention is described with reference to the diagram of FIG. 3, which shows the gas phase concentration before and after a catalyst applying the hydrogen assisted strategy according to the invention. During a certain time period immediately after the starting of the engine 1, an excess of hydrogen is generated. Additional air is also supplied and added to the exhaust gas mixture. Initially, relatively high concentrations of HC and CO are present in the exhaust gas. However, after a certain time period the catalytic converter 3 reaches its light-off temperature, which means that the harmful components HC and CO are converted. After this time period, the generation of hydrogen and the supply of additional oxygen can be maintained to further heat the catalyst.

By means of the invention, a high concentration of hydrogen and an additional supply of oxygen in the exhaust gas mixture is provided. Whilst it might be expected that the hydrogen surplus present should now need to be ignited so as to raise the catalytic converter temperature (as with the afterburner prior art devices) the invention however goes against this hither to adopted principle and instead maintains a hydrogen-rich atmosphere around the catalyser brick(s). Surprisingly the actual light-off temperature of the catalytic converter itself becomes reduced. For $\lambda=0.8$, for example, a catalyst hydrogen light-off temperature of between about 90° C. and 100° C. can be obtained, when using secondary air and a known catalytic converter with a ratio of 1:14:1 parts platinum:palladium:rhodium.

Whilst the invention has been described above with respect to certain preferred embodiments thereof, the invention is not limited to these but, may be varied widely within the scope of the appended claims.

What is claimed is:

1. System for reducing emissions in catalytic converter exhaust systems for an internal combustion engine, comprising air-fuel mixture forming means for providing a mixture of air-fuel to the engine, a catalytic converter for purifying an exhaust gas mixture from the engine, an air supply system for providing a surplus of oxygen to the exhaust gas mixture to the engine, and a control unit adapted for controlling the mixture forming means so that a high concentration of hydrogen is generated in the exhaust gas mixture during the start-up of the engine, wherein said mixture of air-fuel ratio comprises from 2.6% to 10% excess hydrogen, and wherein the major part of the hydrogen is heterogeneously converted in said catalytic converter without an igniting device.

2. System according to claim 1, wherein said air supply system is a separate unit which is connected to said system for providing a supply of surplus oxygen, where the lambda ratio exceeds the value 1, to the exhaust gas mixture during the start-up of the engine.

3. System according to claim 2, wherein said air supply system comprises an air pump.

4. System according to claim 1, wherein said air supply means is provided by the engine having a plurality of combustion chambers, each with an inlet side and exhaust side, said system comprising fuel supply means for supplying vaporised fuel to said inlet side and air supply means for supplying air to said inlet side, and fuel control means for controlling said fuel supply means, said fuel control means being arranged to alter the supply of fuel to at least one combustion chamber of said engine so that said at least one combustion chamber will expel a surplus of air into the exhaust side of said engine, at the same time as other combustion chambers of said engine supply a fuel/air mixture to the inlet side of said engine, said fuel/air mixture being sufficient to generate an exhaust composition with an oxygen content which is large enough for obtaining a combustion of the major part of the hydrogen.

5. System according to claim 4, wherein the fuel control means is arranged completely block supply of fuel to the fuel supply means of said at least one combustion chamber during a limited period of engine rotation from initial start of the engine.

6. System according to claim 4, wherein the fuel control means comprises a lambda control unit sending control signals to the fuel supply means in response to signals received from at least one lambda sensor giving a continuous signal corresponding to the oxygen concentration.

7. System according to any one of the preceding claims, wherein a hydrocarbon adsorber is arranged at a location upstream of the catalytic converter.

8. System according to claim 7, wherein the hydrocarbon adsorbent is located in a washcoat of the catalytic converter.

9. A system according to claim 1, wherein hydrogen is heterogeneously converted in said catalytic converter without an afterburner arrangement.

10. Method for reducing emissions from exhaust systems fitted with catalytic converters by controlling an internal combustion engine, comprising the steps of controlling the input of fuel and air to the engine for obtaining a predetermined air-fuel ratio, said air-fuel ratio being sufficiently low so as to provide an excess of hydrogen in the exhaust gas from the engine, supplying surplus oxygen to the exhaust mixture during start-up of the engine, wherein said mixture of air-fuel ratio comprises from 2.6% to 10% excess hydrogen and, feeding the exhaust gas to a catalytic converter during the start-up of the engine, and maintaining the excess of hydrogen within the catalytic converter so that a major part of the hydrogen is heterogeneously converted in said catalytic converter without an igniting device, thereby providing a decrease of the light-off temperature of the catalytic converter.

11. Method according to claim 10, said engine having a plurality of combustion chambers, each with an inlet side and an exhaust side, said engine also having fuel supply means for supplying vaporised fuel to said inlet side air supply means for supplying air to said inlet side, and fuel control means for controlling said fuel supply means, said method comprising the steps of controlling the fuel control means to alter the supply of fuel to at least one combustion chamber of said engine in such a way that said at least one combustion chamber will expel a surplus of air into the exhaust side of said engine, and at the same time controlling said fuel supply means to supply a fuel/air mixture to the inlet side of said engine of the other combustion chambers of said engine, said fuel/air mixture being sufficient to generate an exhaust composition with an oxygen content which is large enough for obtaining a combustion of the major part of the hydrogen.

12. Method according to claim 11, wherein the fuel control means comprises a lambda control unit sending control signals to the fuel supply means in response to signals received from at least one lambda sensor placed in an exhaust system fitted to said engine, and wherein said lambda control is programmed so as to reduce the supply of fuel to at least one of the engine's combustion chambers to achieve said surplus oxygen.

13. Method according to claim 10, wherein the catalytic converter is subjected to preheating by means of transfer of heat energy from the exhaust gases.

14. Method according to claim 13, wherein said preheating is achieved through a delay of the ignition of the engine.

15. Method according to claim 13, wherein said preheating is achieved by means of oxidation of combustible components in the exhaust gas.

16. A method according to claim 10, wherein hydrogen is heterogeneously converted in said catalytic converter without an afterburner arrangement.

17. Method for reducing emissions from exhaust systems fitted with catalytic converters by controlling an internal combustion engine, comprising the following steps:

preheating the catalytic converter during a predetermined first time period, controlling the input of fuel and air to the engine for obtaining a predetermined air-fuel ratio during a second time period, said air-fuel ratio being sufficiently low so as to provide an excess of hydrogen in the exhaust gas from the engine, supplying surplus oxygen to the exhaust gas mixture at least during the second time period, and maintaining the excess of hydrogen within the catalytic converter so that a major part of the hydrogen is heterogeneously converted in said catalytic converter, thereby providing a decrease of the light-off temperature of the catalytic converter, wherein said first and second time periods are determined on the basis of whether the heat energy generated from the catalytic reaction in the catalytic converter is greater than the heat energy supplied to the catalytic converter from the exhaust cases.

18. Method for reducing emissions from exhaust systems fitted with catalytic converters by controlling an internal combustion engine, comprising the following steps:

preheating the catalytic converter during a predetermined first time period, controlling the input of fuel and air to the engine for obtaining a predetermined air-fuel ratio during a second time period, said air-fuel ratio being sufficiently low so as to provide an excess of hydrogen in the exhaust gas from the engine, supplying surplus oxygen to the exhaust gas mixture at least during the second time period, and maintaining the excess of hydrogen within the catalytic converter so that a major part of the hydrogen is heterogeneously converted in said catalytic converter, thereby providing a decrease of the light-off temperature of the catalytic converter, wherein said first and second time periods are determined on the basis of whether some part of the catalytic converter has reached a temperature which is higher than the light-off temperature of the heterogeneously converted hydrogen.

19. Method for reducing emissions from exhaust systems fitted with catalytic converters by controlling an internal combustion engine, comprising the following steps:

preheating the catalytic converter during a predetermined first time period, controlling the input of fuel and air to the engine for obtaining a predetermined air-fuel ratio during a second time period, said air-fuel ratio being sufficiently low so as to provide an excess of hydrogen in the exhaust gas from the engine, supplying surplus oxygen to the exhaust gas mixture at least during the second time period, and maintaining the excess of hydrogen within the catalytic converter so that a major part of the hydrogen is heterogeneously converted in said catalytic converter, thereby providing a decrease of the light-off temperature of the catalytic converter, wherein said first and second time periods are determined on the basis of whether some part of the catalytic converter has reached a temperature which is higher than the light-off temperature of the heterogeneously converted hydrocarbon compounds.

* * * * *